J. H. DERR.
ANIMAL FEED TROUGH.
APPLICATION FILED APR. 16, 1915.
1,159,190.
Patented Nov. 2, 1915.
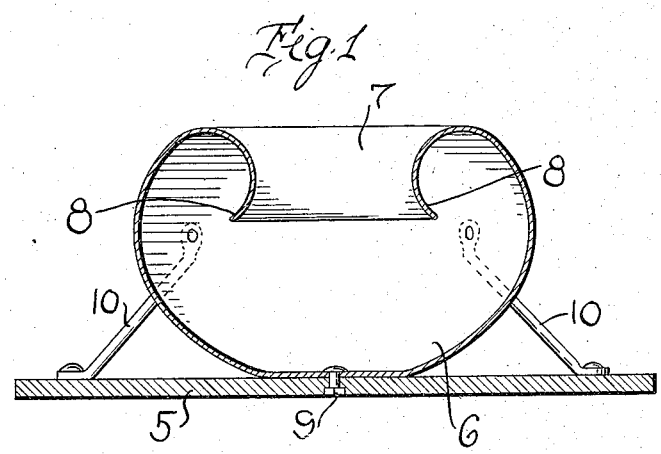
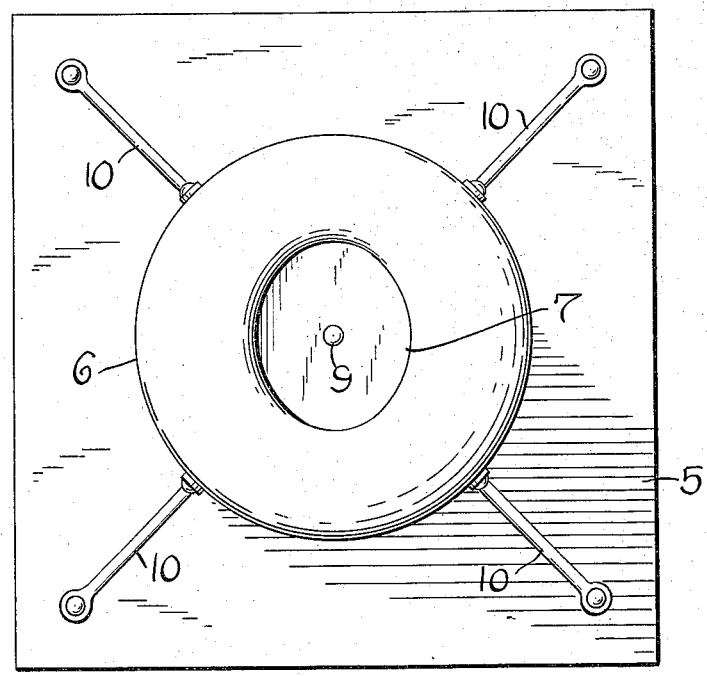
Inventor
J.H. DERR

UNITED STATES PATENT OFFICE.

JAMES H. DERR, OF EDGEWOOD, IOWA.

ANIMAL FEED-TROUGH.

1,159,190.  Specification of Letters Patent.  Patented Nov. 2, 1915.

Application filed April 16, 1915. Serial No. 21,685.

*To all whom it may concern:*

Be it known that I, JAMES H. DERR, a citizen of the United States, residing at Edgewood, in the county of Clayton and State of Iowa, have invented certain new and useful Improvements in Animal Feed-Troughs, of which the following is a specification, reference being had to the accompanying drawings.

This invention relates to an improved animal feed trough, and has for its primary object to provide a device of the above character which is so constructed that the animal cannot throw the feed out of the trough by moving the head or rooting therein or blowing air through the nostrils into the feed.

It is an additional object of my invention to provide an animal feed trough which is of exceedingly simple form as well as highly durable in actual use, and will satisfactorily maintain the end for which the same is primarily designed.

With the above and other objects in view, my invention consists in the novel features of construction, combination, and arrangement of parts to be hereinafter more fully described, claimed, and illustrated in the accompanying drawing, in which, Figure 1 is a vertical section of a feed trough constructed in accordance with the preferred embodiment of my invention; and Fig. 2 is a top plan view thereof.

Referring to in detail to the drawing, 5 designates the baseboard or platform upon which the feed trough is mounted and secured.

The trough consists of a bowl-shaped body, indicated at 6, which is preferably constructed of sheet metal and is of approximately circular form in plan. This trough body is of maximum diameter at a point midway between its base and the top thereof, and at its upper end, is contracted to produce a substantially oval-shaped entrance opening to the interior of the trough, as indicated at 7. The body wall of the trough at its upper end, is bent inwardly and downwardly to form a depending curved lip or flange 8 around the edge of this entrance opening. At its base, the body of the trough is secured to the board or platform 5 by means of a bolt, indicated at 9.

In order to effectively brace the walls of the trough body, I provide a pair of obliquely inclined brace rods or bars 10 at opposite sides of the trough. These rods, at their lower ends, are bolted or otherwise rigidly fixed to the platform 5 and have their upper ends similarly secured to the medial portion of the body wall of the trough.

By the provision of a trough constructed in the manner above stated, the advantages accruing thereto will be manifest. The entrance opening 7 is sufficiently large to enable a horse or other animal to insert its mouth into the trough so that it may conveniently reach the feed therein. The inwardly and downwardly curved marginal flange 8 surrounding the entrance to the trough, will effectually prevent the feed being thrown out of the trough by violent movements of the animal's head therein or blowing of blasts of air through the nostrils into the feed. The feed will be thrown upwardly against the outer walls of the trough body and the curved flange 8 will serve to direct the same away from the entrance opening 7 and back into the trough. Thus, considerable economy will be realized by preventing undue waste of the feed. It will also be seen that, owing to the peculiar form of the trough body, rats or other rodents cannot consume the feed, or, if they do enter the trough, they will be unable to escape therefrom.

From the foregoing description, taken in connection with the accompanying drawing, the construction and several advantages of the invention will be clearly understood. The device, while exceedingly simple, is very effective for the purposes in view and is also highly durable and serviceable in actual use.

While I have shown and described the preferred construction and arrangement of the several features of the device, it is to be understood that the same is susceptible of considerable modification therein, and I, therefore, reserve the privilege of resorting to all such legitimate changes as may be fairly embodied within the spirit and scope of the invention as claimed.

Having thus fully described my invention, what I desire to claim and secure by Letters Patent is:—

As an improved article of manufacture, a feed trough constructed from a single metal sheet and having a spherical-shaped body provided with a flattened base, said metal sheet at the top of the body being formed with an inwardly and downwardly curved flange the rim of which is outwardly flared, said flange defining a contracted substantially oval-shaped entrance mouth to the trough, substantially as and for the purpose specified.

In testimony whereof I hereunto affix my signature in the presence of two witnesses.

JAMES H. DERR.

Witnesses:
J. W. FORWARD,
F. T. PILKINGTON.

Copies of this patent may be obtained for five cents each, by addressing the "Commissioner of Patents, Washington, D. C."